(12) United States Patent
AshokKumar et al.

(10) Patent No.: US 11,513,906 B2
(45) Date of Patent: Nov. 29, 2022

(54) SYSTEMS AND METHODS FOR AUTOMATIC BACKUP SCHEDULING BASED ON BACKUP HISTORY

(71) Applicant: EMC IP Holding Company LLC, Hopkinton, MA (US)

(72) Inventors: Pravin Kumar AshokKumar, Bangalore (IN); Sunder Ramesh Andra, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 318 days.

(21) Appl. No.: 16/598,658

(22) Filed: Oct. 10, 2019

(65) Prior Publication Data

US 2021/0109817 A1    Apr. 15, 2021

(51) Int. Cl.
*G06F 16/24* (2019.01)
*G06F 11/14* (2006.01)
*G06F 16/2455* (2019.01)

(52) U.S. Cl.
CPC .... *G06F 11/1461* (2013.01); *G06F 16/24553* (2019.01); *G06F 2201/80* (2013.01)

(58) Field of Classification Search
CPC ........... G06F 11/1461; G06F 16/24553; G06F 2201/80
See application file for complete search history.

(56) References Cited

U.S. PATENT DOCUMENTS

| 10,061,852 B1* | 8/2018 | Plenderleith | .......... H04L 67/568 |
| 2009/0327362 A1* | 12/2009 | Shah | .................. G06F 11/1451 |
| 2014/0259074 A1* | 9/2014 | Ansari | .................. B05D 1/305 |
| | | | 725/50 |

* cited by examiner

*Primary Examiner* — Loc Tran
(74) *Attorney, Agent, or Firm* — Womble Bond Dickinson (US) LLP

(57) ABSTRACT

Methods and systems for data backup are described. According to some embodiments, the method includes in response to receiving a request for database instance discovery, retrieving backup history information. The method further includes filtering the backup history information to obtain selected backup information. The method further includes sending an instance discovery response that includes the selected backup information. The method further includes generating one or more protection policies based on the selected backup information.

17 Claims, 5 Drawing Sheets

| | backup_type | backup_start_date | backup_finish_date | last_lsn | database_name |
|---|---|---|---|---|---|
| 1 | D | 2019-01-07 01:30:33.000 | 2019-01-07 01:30:33.000 | 36000000019200001 | sqldb1 |
| 2 | D | 2019-01-07 20:38:38.000 | 2019-01-07 20:38:38.000 | 36000000022200001 | sqldb2 |
| 3 | L | 2019-01-07 20:38:38.000 | 2019-01-07 20:38:38.000 | 36000000029200001 | sqldb2 |

SYSTEMS AND METHODS FOR AUTOMATIC BACKUP SCHEDULING BASED ON BACKUP HISTORY

FIELD OF THE INVENTION

Embodiments of the present disclosure relate generally to data storage systems. More particularly, embodiments of the invention relate to systems and methods for automatic backup scheduling based on backup history.

BACKGROUND

With the existing data backup approach, a backup administration (or admin) would create backup schedule policies on his/her own, and to schedule the policies, the backup admin needs to touch base with a database admin to understand various criteria, manually make a note of backup information, then create schedule policies accordingly.

Unfortunately, under the conventional approach, the backup admin would depend on the database admin by manually collecting the backup information before creating the schedule policies. Moreover, when a client migrates to another data protection system, the client will inherit backup data but it does not inherit backup schedules. Thus, the backup admin needs to recreate the schedule policies.

BRIEF DESCRIPTION OF THE DRAWINGS

Embodiments of the invention are illustrated by way of example and not limitation in the figures of the accompanying drawings in which like references indicate similar elements.

FIG. 2 is a diagram illustrating an example backup history according to one embodiment.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure bridge the information gap between a backup admin and an application database admin to schedule backups. With this approach (as described in more detail herein) the backup admin does not need to worry about the backup service-level agreement (SLA) while scheduling the backup policies, and avoids manual collection of information for database backup from the database admin. This solution also helps in addressing seamless client migration with database backup schedule policies also intact, and thus, there is no need to recreate scheduling backup policies.

According to some embodiments, a method for data backup is described. The method includes in response to receiving a request for database instance discovery, retrieving backup history information. The method further includes filtering the backup history information to obtain selected backup information. The method further includes sending an instance discovery response that includes the selected backup information. The method further includes generating one or more protection policies based on the selected backup information.

Figure 1:
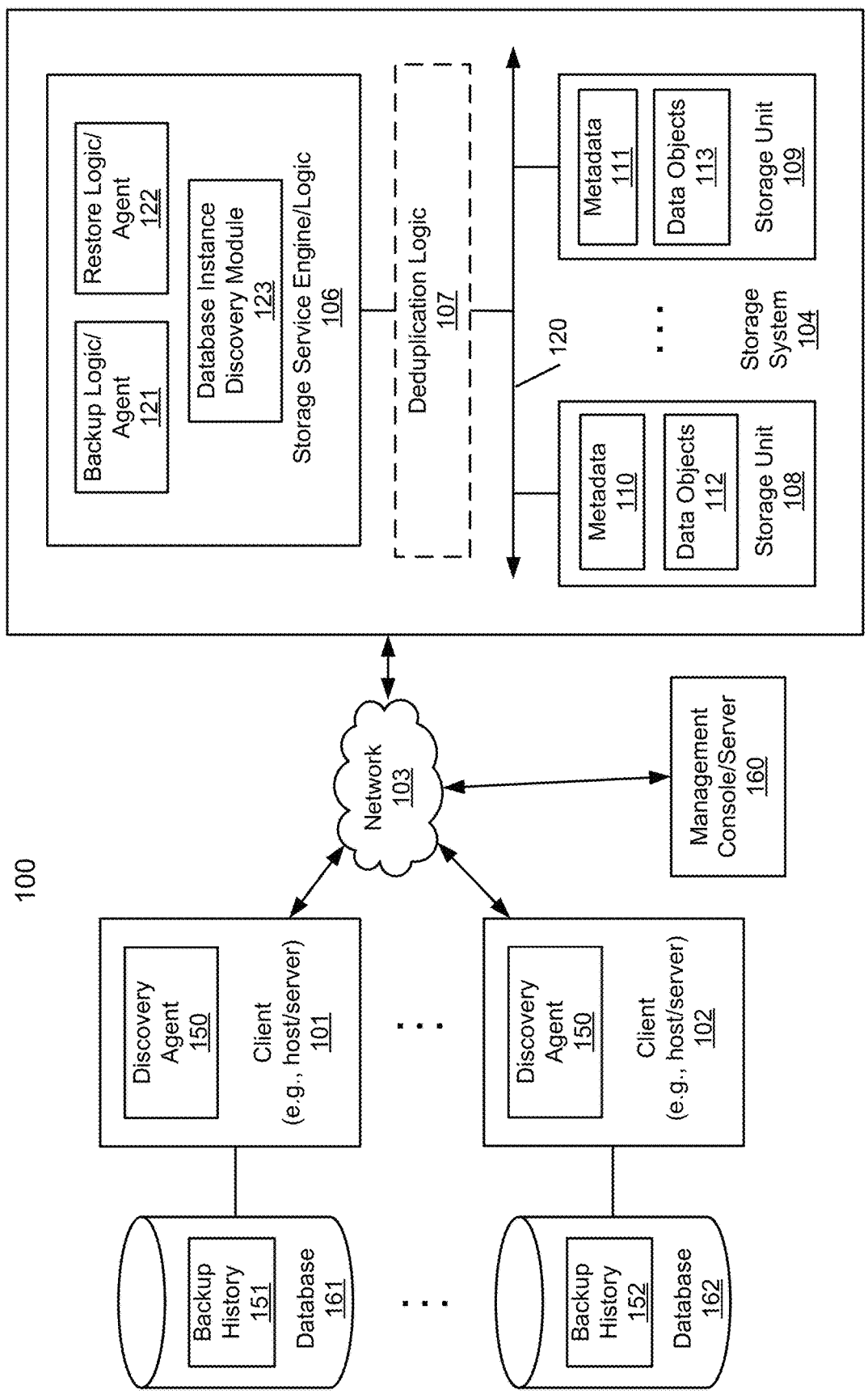
FIG. 1 is a block diagram illustrating a storage system according to one embodiment.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic or agent 121 is configured to receive and back up data from a client (e.g., clients 101-102) and to store the backup data in any one or more of storage units 108-109. Restore logic or agent 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks), for example as data objects 112-113, according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources (e.g., databases 161-162) may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

In one embodiment, the administrator of management console or server 160 may access the storage manager that may invoke database instance discovery module 123. Module 123 may send a request for database instance discovery to clients 101-102 that are coupled or connected to databases 161-162, respectively. It is noted that while FIG. 1 shows each of clients 101-102 as being coupled or connected to a single database (e.g., databases 161-162), in some embodiments, each of clients 101-102 may be coupled or connected to a multiplicity of databases.

In response to the request, discovery agent 150 running on each of clients 101-102 may retrieve backup history information, for example, from backup history 151 and backup history 152, respectively. As shown, backup histories 151-152 are stored in databases 161-162, respectively. With reference now to FIG. 2, which is a diagram illustrating an example backup history according to one embodiment, each of backup histories 151-152 may include backup history information, such as, for example, backup type, backup start date and time, backup finish date and time, last log sequence number (LSN), and database name. In one embodiment, agent 150 may filter the backup history information using a SELECT database query to obtain selected or desired backup information (e.g., backup type, backup start date and time). The SELECT database query, for example, may be in the following form:

SELECT type as backup_type, backup_start_date, database_name FROM msdb . . . backupset;

In one embodiment, each of backup histories 151-152 is generated or updated when a backup is performed to a client (e.g., clients 101-102). Once the selected or desired backup information is obtained, agent 150 may send an instance discovery response that includes the selected or desired backup information to module 123. In one embodiment, when creating a protection policy for each database (e.g., databases 161-162), agent 150 may automatically prompt or present (e.g., via a pop-up window) the administrator of management console or server 160 with a recommended backup schedule for the policy based on the selected backup information. The administrator, for example, may be prompted when the administrator initiates the storage manager and selects an appropriate database instance asset. The recommended backup schedule may include information, such as, for example, a full backup interval, a backup type (e.g., differential or log), an amount of time to keep a snapshot (or backup data), a backup start time, and/or a backup end time. As previously described, some of the information may be obtained from the selected backup information (e.g., backup type, backup start time, backup end time). In some embodiments, information of the backup schedule is editable by the administrator as needed. Once the policy creation is completed, a backup may be trigger in accordance with the policy.

Figure 3:
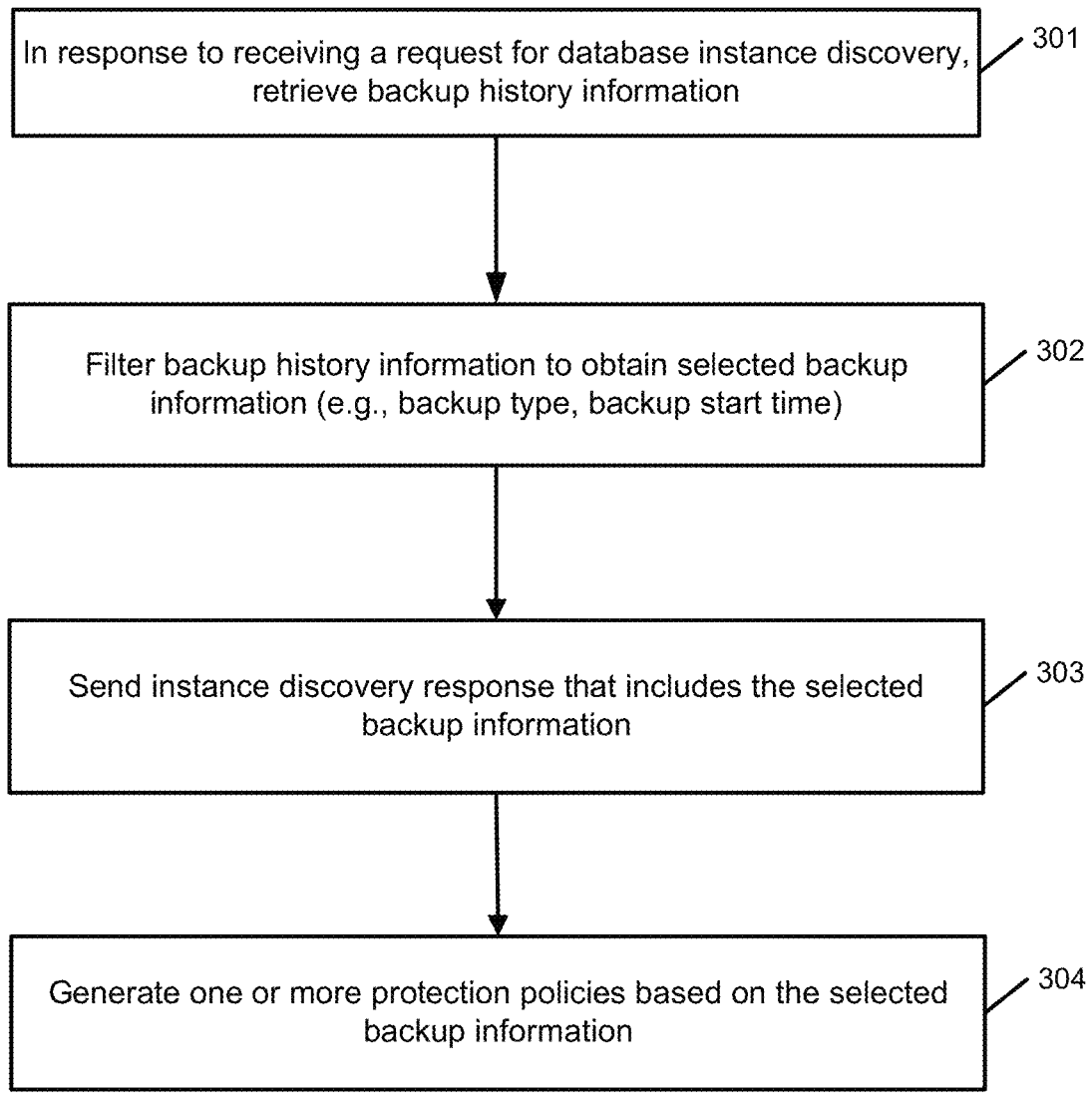
FIG. 3 is a flow diagram illustrating a method for backing up data according to one embodiment.

FIG. 3 is a flow diagram illustrating a method for backing up data according to one embodiment. Process 300 may be performed by processing logic that includes hardware (e.g. circuitry, dedicated logic, etc.), software (e.g., embodied on a non-transitory computer readable medium), or a combination thereof. For example, process 300 may be performed by discovery agent 150 of FIG. 1.

Referring to FIG. 3, at block 301, the processing logic retrieves backup history information (e.g., from backup histories 151-152) in response to receiving a request for database instance discovery. At block 302, the processing logic filters backup history information to obtain selected backup information (e.g., backup type, backup start time). At block 303, the processing logic sends an instance discovery response that includes the selected backup information. At block 304, the processing logic generates one or more protection policies based on the selected backup information. For example, as previously described, in generating the protection policies for the databases (e.g., databases 151-152), an administrator may automatically be prompted or presented (e.g., via a pop-up window) with a recommended backup schedule for each policy based on the selected backup information. The recommended backup schedule may include information, such as, for example, a full backup interval, a backup type (e.g., differential or log), an amount of time to keep a snapshot (or backup data), a backup start time, and/or a backup end time. As previously described, some of the information may be obtained from the selected backup information (e.g., backup type, backup start time, backup end time).

Figure 4:
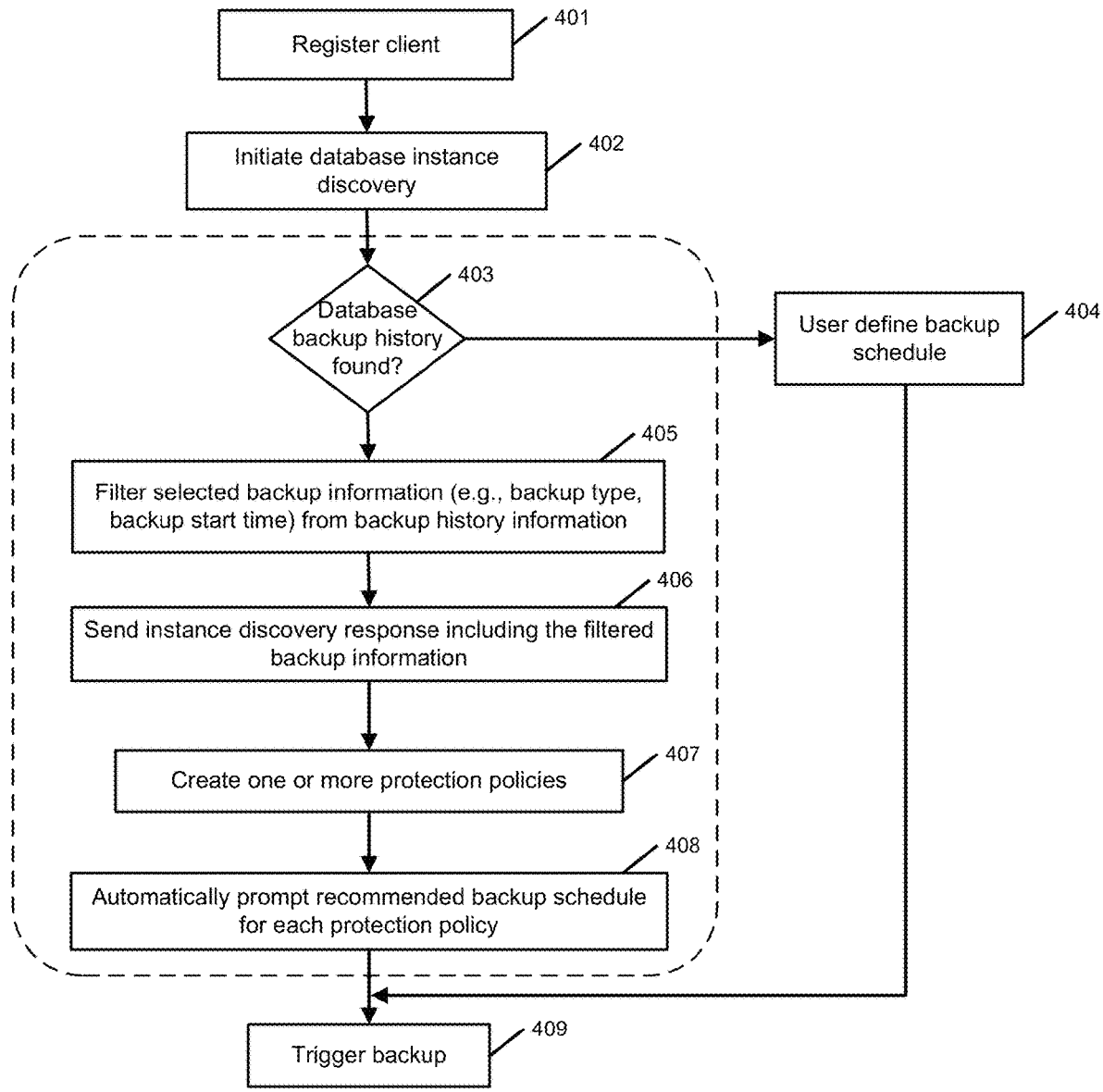
FIG. 4 is a flow diagram illustrating another method for backing up data according to one embodiment.

FIG. 4 is a flow diagram illustrating another method for backing up data according to one embodiment. Process 400 may be performed by processing logic that includes hardware (e.g. circuitry, dedicated logic, etc.), software (e.g., embodied on a non-transitory computer readable medium), or a combination thereof. For example, process 400 may be performed by database instance discovery module 123, discovery agent 150, or a combination thereof.

Referring to FIG. 4, at block 401, the processing logic registers a client for database instance discovery (e.g., clients 101-102). At block 402, the processing logic initiates database instance discovery. In one embodiment, the database instance discovery may be initiated when an administrator accesses a storage manager, as previously described. At block 403, the processing logic determines whether a database backup history is found. If so, the processing logic proceeds to block 405. Otherwise, the processing logic proceeds to block 404 where a user or administrator is to manually define a backup schedule. At block 405, the processing logic filters selected backup information (e.g., backup type, backup start time) from backup history information in a found backup history. As previously described, the selected backup information may be obtained by using a SELECT database query to filter the backup history information. At block 406, the processing logic sends an instance discovery response including the filtered backup information. At block 407, the processing logic creates one or more protection policies. At block 408, the processing logic automatically prompts a recommended backup schedule for each protection policy. At block 409, the processing logic triggers a backup based on the created policies.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
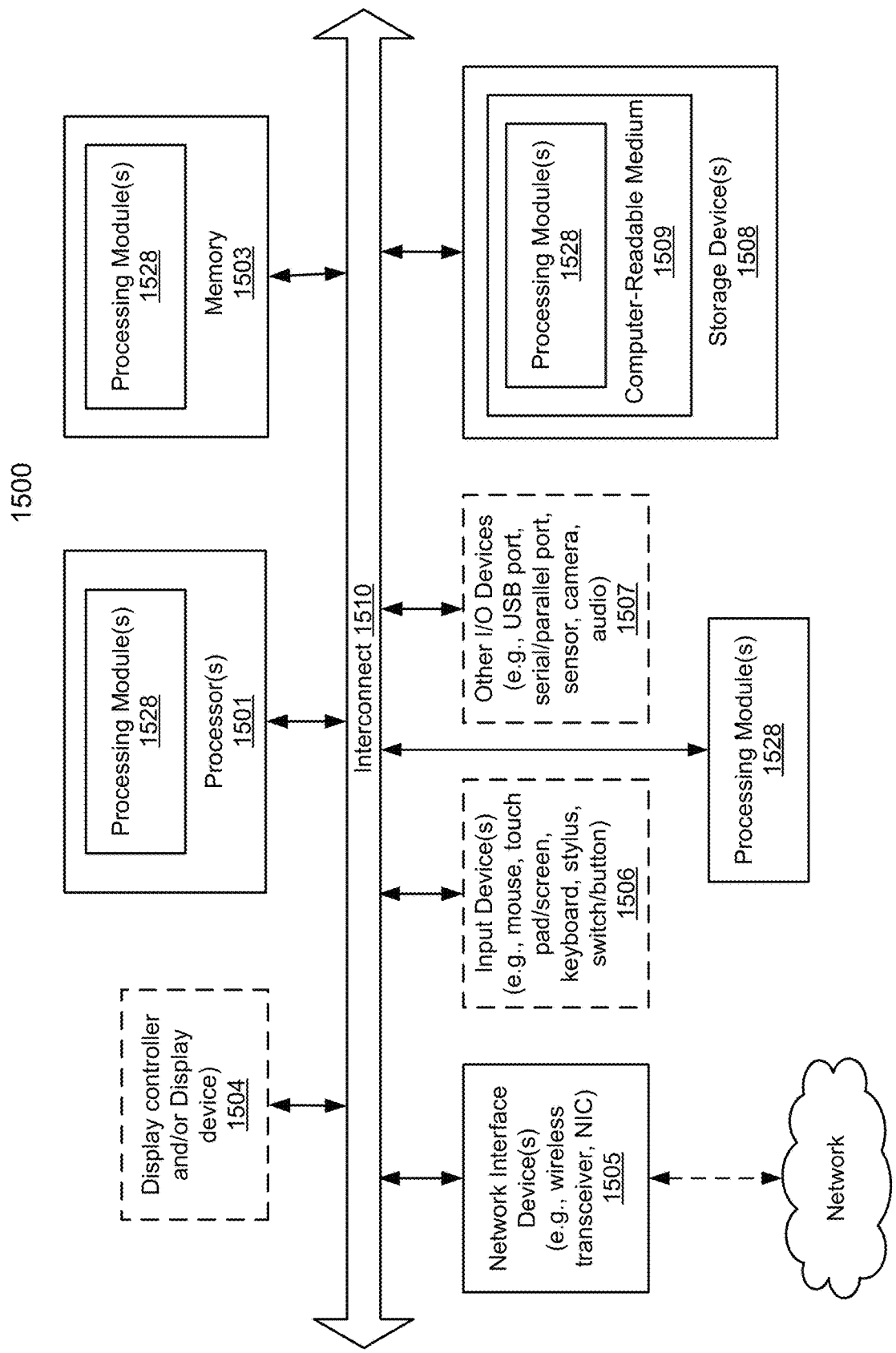
FIG. 5 is a block diagram illustrating a data processing system according to one embodiment.

FIG. 5 is a block diagram illustrating an example of a data processing system which may be used with one embodiment. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, modules 121-123 and 150 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for automatic data backup scheduling, the method comprising:
   in response to receiving, by a client device from a server, a request for database instance discovery:
   retrieving, by the client device, backup history information;
   filtering, by the client device, the backup history information using a database query to obtain desired backup information;
   sending, by the client device to the server, an instance discovery response that includes the desired backup information;
   generating, by the client device, one or more protection policies based on the desired backup information; and
   automatically prompting, by the client device, a recommended backup schedule for each protection policy, wherein the recommended backup schedule includes information obtained from the desired backup information.

2. The method of claim 1, wherein the database query is a SELECT database query.

3. The method of claim 1, wherein the backup history information includes at least one of: a backup type, a backup start date, a backup start time, a backup finish date, a backup finish time, a last log sequence number (LSN), or a database name.

4. The method of claim 1, wherein the selected backup information includes a backup type, a backup start date, and a backup start time.

5. The method of claim 1, wherein subsequent to generating the one or more protection policies, triggering, by the client device, a backup based on the generated protection policies.

6. The method of claim 1, further comprising:
   determining, by the client device, whether a backup history is found, wherein the backup history comprises the backup history information if found; and
   wherein an administrator is to define a backup schedule if the backup history is not found.

7. A non-transitory machine-readable medium having instructions stored therein, which when executed by a processor, cause the processor to perform operations, the operations comprising:
   in response to receiving, from a server, a request for database instance discovery:
   retrieving backup history information;
   filtering the backup history information using a database query to obtain desired backup information;
   sending, to the server, an instance discovery response that includes the desired backup information;
   generating one or more protection policies based on the desired backup information: and
   automatically prompting a recommended backup schedule for each protection policy, wherein the recommended backup schedule includes information obtained from the desired backup information.

8. The non-transitory machine-readable medium of claim 7, wherein the database query is a SELECT database query.

9. The non-transitory machine-readable medium of claim 7, wherein the backup history information includes at least one of: a backup type, a backup start date, a backup start time, a backup finish date, a backup finish time, a last log sequence number (LSN), or a database name.

10. The non-transitory machine-readable medium of claim 7, wherein the selected backup information includes a backup type, a backup start date, and a backup start time.

11. The non-transitory machine-readable medium of claim 7, wherein subsequent to generating the one or more protection policies, triggering a backup based on the generated protection policies.

12. The non-transitory machine-readable medium of claim 7, wherein the operations further comprise:
   determining whether a backup history is found, wherein the backup history comprises the backup history information if found; and
   wherein an administrator is to define a backup schedule if the backup history is not found.

13. A data processing system, comprising:
   a processor; and a memory coupled to the processor to store instructions, which when executed by the processor, cause the processor to perform operations, the operations including:
   in response to receiving, from a server, a request for database instance discovery:
   retrieving backup history information;

filtering the backup history information using a database query to obtain desired backup information;

sending, to the server, an instance discovery response that includes the desired backup information;

generating one or more protection policies based on the desired backup information: and automatically prompting a recommended backup schedule for each protection policy, wherein the recommended backup schedule includes information obtained from the desired backup information.

14. The data processing system of claim 13, wherein the database query is a SELECT database query.

15. The data processing system of claim 13, wherein the backup history information includes at least one of: a backup type, a backup start date, a backup start time, a backup finish date, a backup finish time, a last log sequence number (LSN), or a database name.

16. The data processing system of claim 13, wherein the selected backup information includes a backup type, a backup start date, and a backup start time.

17. The data processing system of claim 13, wherein subsequent to generating the one or more protection policies, triggering a backup based on the generated protection policies.

\* \* \* \* \*

UNITED STATES PATENT AND TRADEMARK OFFICE
CERTIFICATE OF CORRECTION

PATENT NO. : 11,513,906 B2
APPLICATION NO. : 16/598658
DATED : November 29, 2022
INVENTOR(S) : Pravin Kumar AshokKumar and Sunder Ramesh Andra It is certified that error appears in the above-identified patent and that said Letters Patent is hereby corrected as shown below:

In the Claims

In Claim 7, Column 10, Line 34, delete "desired backup information: and" and insert --desired backup information; and--.

In Claim 13, Column 11, Line 6, delete "desired backup information: and" and insert --desired backup information; and--.

Signed and Sealed this
Ninth Day of April, 2024

Katherine Kelly Vidal
*Director of the United States Patent and Trademark Office*